(12) United States Patent
Fange-Larsen (10) Patent No.: US 10,844,881 B2
(45) Date of Patent: Nov. 24, 2020

(54) APPARATUS FOR OUTPUTTING A SOLID MATERIAL, SUCH AS ENTRAINED IN A FLUID

(71) Applicant: Fange Innova, Faarevejle (DK)

(72) Inventor: Per Fange-Larsen, Faarevejle (DK)

(73) Assignee: Fange Innova, Faarevejle (DK)

(\*) Notice: Subject to any disclaimer, the term of this patent is extended or adjusted under 35 U.S.C. 154(b) by 0 days.

(21) Appl. No.: 16/088,339

(22) PCT Filed: Mar. 27, 2017

(86) PCT No.: PCT/DK2017/000004
§ 371 (c)(1),
(2) Date: Sep. 25, 2018

(87) PCT Pub. No.: WO2017/167334
PCT Pub. Date: Oct. 5, 2017

(65) Prior Publication Data
US 2019/0113055 A1    Apr. 18, 2019

(30) Foreign Application Priority Data
Mar. 28, 2016    (DK) .................................. 2016 00187

(51) Int. Cl.
*B65G 33/08*    (2006.01)
*B65G 33/34*    (2006.01)
(Continued)

(52) U.S. Cl.
CPC ............ *F15B 15/061* (2013.01); *B24C 1/003* (2013.01); *B24C 5/02* (2013.01); *B24C 7/0092* (2013.01);
(Continued)

(58) Field of Classification Search
CPC ........ B65G 33/03; B65G 33/34; B65G 65/46; F15B 11/17; B24C 5/02
(Continued)

(56) References Cited

U.S. PATENT DOCUMENTS 4,363,571 A * 12/1982 Jackson ................. B65G 53/48
                                                          198/601
4,820,375 A *  4/1989 Memmel, Jr. ........... B42C 7/001
                                                          156/362

(Continued)

FOREIGN PATENT DOCUMENTS

DE        3546276        4/1986
DE        8702594 U      6/1987
(Continued)

*Primary Examiner* — Douglas A Hess
(74) *Attorney, Agent, or Firm* — McHale & Slavin, P.A.

(57) ABSTRACT

An apparatus for outputting a solid material entrained in a fluid, the apparatus comprising a receptacle for receiving the solid material, an input for the fluid, an output for solid material, an auger for transporting the solid material from the receptacle to the output, a motor for driving the auger, wherein the motor comprises one or more cylinders each comprising a piston, a second input connected to the input so as to feed part of the fluid to the cylinders, where a cross section of a piston is at least 700 mm$^2$ or wherein a drive transforming the reciprocating movement of each piston, relative to the cylinder, to rotation of the auger around the first axis, is configured to rotate the auger at least 20 degrees when a cylinder completes a cycle.

23 Claims, 5 Drawing Sheets

(51) Int. Cl.

| | | |
|---|---|---|
| *B65G 65/46* | (2006.01) | |
| *F15B 11/17* | (2006.01) | |
| *F15B 15/06* | (2006.01) | |
| *F16H 19/06* | (2006.01) | |
| *B24C 1/00* | (2006.01) | |
| *F16H 31/00* | (2006.01) | |
| *B24C 5/02* | (2006.01) | |
| *B24C 7/00* | (2006.01) | |
| *F15B 15/14* | (2006.01) | |

(52) U.S. Cl.
 CPC .......... *B65G 33/08* (2013.01); *B65G 33/34* (2013.01); *B65G 65/46* (2013.01); *F15B 11/17* (2013.01); *F15B 15/1404* (2013.01); *F16H 19/0622* (2013.01); *F16H 31/001* (2013.01); *F15B 2211/7054* (2013.01); *F15B 2211/7107* (2013.01); *F16H 2019/0681* (2013.01); *F16H 2019/0686* (2013.01)

(58) Field of Classification Search
 USPC .............................. 198/548, 550.1, 617, 657
 See application file for complete search history.

(56) References Cited

U.S. PATENT DOCUMENTS

| | | | | |
|---|---|---|---|---|
| 5,333,762 A * | 8/1994 | Andrews | ............... | B65G 65/46 198/671 |
| 5,511,925 A * | 4/1996 | Muth | ................... | B65G 65/466 198/550.6 |
| 5,553,534 A * | 9/1996 | Soavi | ................ | B23Q 11/0057 100/145 |
| 5,871,619 A * | 2/1999 | Finley | ................... | C10B 33/02 198/545 |
| 7,004,305 B2 * | 2/2006 | Schaefer | .............. | B65G 65/466 198/550.6 |
| 7,314,131 B2 * | 1/2008 | Olds | ..................... | B65G 33/20 198/658 |
| 7,381,131 B1 * | 6/2008 | Harpole | ................. | A01F 12/46 198/671 |
| 7,390,118 B2 * | 6/2008 | MacDonald | .......... | B29C 45/581 366/80 |
| 8,408,382 B2 * | 4/2013 | Pano | ..................... | A47J 31/404 198/550.01 |
| 8,720,669 B2 * | 5/2014 | Iba | ........................ | B61B 13/125 198/467.1 |
| 8,763,786 B2 * | 7/2014 | Uchinashi | ............... | B65G 33/265 198/661 |
| 9,033,643 B1 * | 5/2015 | Kile | ........................ | B60P 1/42 414/526 |
| 9,227,344 B2 * | 1/2016 | Schmalholz | ........ | B29C 48/2886 |
| 9,321,597 B2 * | 4/2016 | Wilson | ................... | B65G 37/00 |
| 9,376,262 B2 * | 6/2016 | Schroeder | ............. | B65G 33/34 |
| 9,522,787 B2 * | 12/2016 | Kawakami | ............ | B65G 65/46 |
| 9,643,787 B1 * | 5/2017 | Carteri | ................... | B65G 33/18 |
| 9,950,872 B2 * | 4/2018 | Rauser | .................. | B65G 33/32 |
| 10,059,528 B2 * | 8/2018 | Timmins | ................ | B65G 47/30 |
| 10,322,892 B2 * | 6/2019 | Hoogestraat | ......... | B65G 65/46 |
| 10,364,394 B2 * | 7/2019 | Strezov | ................. | B65G 33/26 |
| 10,421,617 B2 * | 9/2019 | Koenig | ................. | B65G 33/32 |
| 2002/0160076 A1 | 10/2002 | Kabuta et al. | | |
| 2012/0199445 A1 * | 8/2012 | Chang et al. | | |
| 2014/0255536 A1 | 9/2014 | Yamaguchi | | |
| 2017/0183165 A1 * | 6/2017 | Timmins et al. | | |
| 2018/0208400 A1 * | 7/2018 | Mcintosh et al. | | |

FOREIGN PATENT DOCUMENTS

| | | |
|---|---|---|
| FR | 1275167 A | 11/1961 |
| JP | 2000185339 | 7/2000 |
| SE | 384908 B | 5/1976 |

* cited by examiner

APPARATUS FOR OUTPUTTING A SOLID MATERIAL, SUCH AS ENTRAINED IN A FLUID

CROSS REFERENCE TO RELATED APPLICATIONS

This is a national stage filing in accordance with 35 U.S.C. § 371 of PCT/DK2017/000004, filed Mar. 27, 2017, which claims the benefit of the priority of Denmark Patent Application No. PA 2016 00187, filed Mar. 28, 2016, the contents of each are incorporated herein by reference.

The present invention relates to an apparatus for outputting a solid material, such as ice, preferably entrained in a fluid, such as a gas or liquid, and in particular for an apparatus for dry ice blasting where dry ice, typically in the form of granules/pellets, is entrained in a flow of pressurized air.

A problem encountered in apparatus of this type, where the dry ice is fed from a hopper to an auger of an auger conveyor or screw conveyor, is that the ice in the auger may compact/freeze to a degree where the auger is stopped. Typical motor types used for driving the auger are driven by the fluid into which the ice is to be entrained but have too little initial torque to re-start the auger again. It is an object of the present invention to provide a new motor type having a sufficient torque.

In a first aspect, the invention relates to an apparatus for outputting a solid material, the apparatus comprising:
  a receptacle for receiving the solid material,
  a first input for the fluid,
  an output for solid material,
  an auger for transporting the solid material from the receptacle to the output,
  a motor configured to drive the auger,
  wherein the motor comprises:
  one or more cylinders each comprising a piston, and
  a second input for the fluid and elements for feeding fluid from the second input to the cylinder(s),
  where a cross section of at least one of the piston(s) is at least 700 mm$^2$.

In the present context, a solid material may be any type of solid material, typically provided as a powder, pellets, resin, pills, granules, or the like. In a preferred embodiment, the solid material is frozen to lower than 0° C., such as below −10° C., such as below −30° C. In one embodiment, the solid material is a frozen gas, such as dry ice.

The receptacle usually is a hopper or open container having a first opening for receiving the solid material and a second opening delivering the received material to the auger. Usually, the first opening is provided at a higher position than the second position for gravity to assist in transporting the material from the first opening to the second opening. In one embodiment, the auger or a portion thereof may be provided in the receptacle to engage the material and feed it toward an output opening of the receptacle and further toward the output of the apparatus.

In a preferred embodiment, the receptacle has 4 upright standing walls of which 3 are at least substantially vertical in the use position, such as with an angle no more than 10 degrees from vertical. The last side tapers from an opening toward an opposing wall, where the auger or an opening toward the auger is positioned close to the opposing wall and a lower side of the tapering wall so that solid material is fed to the auger and/or the opening. Another advantage of this set-up is that the auger or the opening toward the auger may have any desired length. This length may be defined by the length (horizontally, for example) of the opposing side. Then, even if a portion of the opening or auger is out of operation due to clogging of the solid material, other parts of the opening or auger may be operating, guaranteeing constant and sufficient feeding of the auger.

The fluid may be a liquid, a gas or a powder. Typically, the fluid is under pressure, such as at least 3 bar, such as at least 4 bar, such as at least 5 bar, such as at least 6 bar, such as in the interval of 4-40 bar, such as within the interval of 4-25 bar, such as in the interval of 5-16 bar.

In a preferred embodiment, the fluid is air or a gas, such as nitrogen. It may be preferred to filter and/or de-humidify the fluid before feeding the fluid to the motor and/or input. Thus, the apparatus may comprise a filter and/or de-humidifier.

Naturally, the apparatus may also comprise a system for providing the fluid, such as an air compressor.

The input for the fluid may be a standard input for pressurized liquid/gas, such as a connector or the like. The second input may be a separate input or an input receiving fluid from the first input.

The output for the solid material may simply be an opening through which the material is to be fed. The opening may comprise a connector or the like for connecting to e.g. a hose, tube or the like. The output and/or hose/tube may comprise a flow of the same or another fluid for transporting the material away from the output, such as toward a dispensing element, such as a nozzle or the like. Thus, the apparatus may comprise a dispenser, such as a nozzle, gun or handle, to which the material may be fed and subsequently output.

In one situation, the nozzle/gun/handle also receives the fluid and entrains the material with the fluid before dispensing. Naturally, the nozzle/gun/handle may have an activator, such as a trigger, and is configured to only dispense the material when the activator is activated.

In one situation, the material is fed through the tube/hose by a vacuum generated in the nozzle/gun/handle by a Venturi effect generated on the basis of the fluid also provided to the nozzle/gun/handle. In this situation, the gun/nozzle/handle may be connected to the apparatus via two tubes, one carrying the fluid (this may also be received directly from a fluid source and not from the apparatus) and another carrying the material.

In an alternative situation, a single tube is used where the material is entrained in the fluid at or in the apparatus and carried, the material entrained in the fluid, from the apparatus to the nozzle/gun/handle.

The auger transports the solid material from the receptacle to the output. In this context, an auger is an element having an outer surface defining a continuous ridge spiraling around an axis of the auger and along a longitudinal direction of the auger. This auger may also be called a auger screw, a screw blade, such as a helical screw blade or a flighting. An auger may be a helical coil, such as an element having a hollow centre (also called a centre-less screw conveyor), or a screw-shaped element having a solid centre. The auger may have a portion with a solid centre and a portion with a hollow centre.

A pitch of the outer ridge-shaped surface may be the same along the length of the auger or it may change along the length of the auger.

An outer diameter of the outer ridge-shaped surface may change along the length of the auger, or it may be at least substantially the same. Also, a height of such surface, i.e. a distance between the outer diameter and a diameter of a solid centre or axle or, if the centre is hollow, between the outer diameter and the centre axis, may be the same or differ along the length of the auger.

The operation of the auger is to, by rotating, moving material from the receptacle toward the output. When the auger rotates, spaces defined by the individual windings or coil-shapes or ridges will translate toward the output, thus transporting material therein toward the output.

The auger may be designed so that such spaces change in size or volume along the length of the auger, as this defines the manner in which material from the receptacle enters the auger.

Part of the length of the auger may be provided inside a tube having an inner diameter corresponding to an outer diameter of the portion of the auger positioned in the tube.

The present motor drives the auger, such as via a drive converting motion of the pistons to rotation of the auger. The motor is driven by fluid from the second input entering the motor and being fed to the cylinder(s).

Naturally, any number of cylinders may be used, such as 1, 2, 3, 4, 5, 6, 7, 8, 9, 10 or more. In each cylinder, a piston is provided, as is usual in piston-driven motors. The fluid entering the cylinder will drive the piston from a first position to a second position, where after the piston is re-set into the first position in order to have a reciprocating movement. Usually, the reciprocating movement is linear, but also rotational motors exist.

A cylinder usually has at least substantially the same cross-sectional area along a length thereof in which the piston moves, so that a fixed-size piston may move in a sealed manner within the cylinder along the path defining the reciprocating movement. Usually, the cross-section of the cylinder and the piston is circular, but oval shapes as well as other shapes may be used.

Often, a drive is provided having one or more axles to which the piston(s) is/are connected, where a linear movement of the piston(s) is converted into a rotation of the axle(s). The auger may then be directly connected to the/an axle, such as if these elements are integral, or a connection may be used in the form of e.g. a gear, a belt/chain drive or the like.

According to the invention, a cross section of a piston, such as in a plane perpendicular to a direction of movement of the cylinder, is at least 700 mm$^2$, such as at least 800 mm$^2$, such as at least 900 mm$^2$, such as at least 1000 mm$^2$, such as at least 1100 mm$^2$, such as at least 1200 mm$^2$, such as at least 1500 mm$^2$, such as at least 1600 mm$^2$.

Naturally, the torque generated will depend on a number of factors, such as the pressure of the fluid driving the piston(s) as well as the number of pistons operated in parallel.

Multiple pistons may be operated serially, so that only a fraction of the pistons are driven by the fluid at the same time where, at points in time where these pistons are not driven by the fluid, other of the pistons are operated by the fluid. This type of operation is seen in a 4 cylinder car engine where only a single cylinder drives the crank shaft at any point in time.

However, if multiple pistons are operated (driven by the fluid) at the same time, the cross sections of such pistons should be added, as their parallel operation is tantamount to the operation of a piston with the combined cross section.

Preferably, the fluid is provided to the second input under pressure, so that the pressure may drive the motor. This pressure may be selected to provide a desired torque from the motor to the auger. Naturally, the pressure may be altered to adjust the torque and/or rotational speed of the motor.

The apparatus thus may have a pressure gauge, a pressure limiter or a pressure relief valve for determining and/or determining a pressure of the fluid for use in the motor. It may be desired to operate the motor at a predetermined pressure independently of a pressure received at the first input of the fluid. Thus, a pressure limiter or pressure relief valve or element may be provided between the first and second inputs.

It may be desired to provide an element circumventing any pressure limitation so that the pressure of the fluid received at the first input is fed to the motor in full or part, via the second input. This may be for use in a situation where the auger is stuck due to compressed material. Circumventing the pressure limiter will increase the torque available from the motor for overcoming the locking or fixing of the auger and again rotating the auger. Preferably, this torque increase is controlled in a manner so that a desired maximum rotational velocity of the auger is not exceeded.

In a preferred embodiment, the piston(s) is/are driven in both directions of the reciprocating movement. This may be obtained by intermittently providing the fluid on opposite sides of the piston. The piston may thus always be driven and thus not require the operation of another piston to revert to an initial position. In this manner, a single piston may be used for driving the auger. Multiple pistons, however, is desired both for redundancy/reliability but also in order to ensure that the same torque is delivered in both movement directions of the piston.

Naturally, the invention also relates to a manner of operating the above apparatus.

A second aspect of the invention relates so an apparatus for outputting a solid material, the apparatus comprising:
  a receptacle for receiving the solid material,
  an input for the fluid,
  an output for solid material,
  an auger for transporting the solid material from the receptacle to the output, the auger being configured to rotate around a first axis,
  a motor for driving the auger,
  wherein the motor comprises:
  one or more cylinders each comprising a piston configured to move within
  the pertaining cylinder in a cyclical, reciprocating movement, and
  a drive transforming the reciprocating movement of each piston, in relation to the cylinder, into rotation of the auger around the first axis,
  wherein the drive is configured to rotate the auger at least 20 degrees when a cylinder completes a cycle.

Naturally, this aspect may be combined with the above aspects of the invention, and the above description of the receptacle, inputs/outputs, auger, cylinder(s) and piston(s) is equally relevant for this aspect of the invention.

According the second aspect of the invention, a drive is provided transforming the reciprocating movement of each piston to rotation of the auger around the first axis, wherein the drive is configured to rotate the auger at least 20 degrees when a cylinder completes a cycle.

Naturally, the motor preferably is capable of delivering a torque sufficient to drive the auger under usual circumstances. However, when the drive rotates the auger at least 20 degrees per cylinder cycle, a predetermined torque is delivered even in the situation where the auger is stationary, such as when clogged by compacted material.

Preferably, one piston cycle rotates the auger at least 25 degrees, such as at least 30 degrees, such as at least 35 degrees, such as at least 40 degrees, such as at least 45 degrees, such as at least 50 degrees, such as at least 60 degrees, such as at least 70 degrees, such as at least 80 degrees, such as at least 90 degrees, such as at least 100 degrees, such as at least 120 degrees, such as at least 140 degrees, such as at least 160 degrees, such as at least 180 degrees.

Naturally, the drive may comprise any type of elements for converting the piston movement into auger rotation, such as a belt drive, chain drive, gears, toothed wheels, a rotary clutch or the like. In one situation, the drive comprises one or more rotating axles configured to be rotated by the reciprocating movement of the piston(s). The auger may then be directly connected to such axle(s), such as if these elements are integral, or may be connected thereto via e.g. a gear, a belt, a chain or the like.

A third aspect of the invention relates to a method of operating the apparatus according to the first aspect, the method comprising:

providing the solid material in the receptacle,
feeding the fluid to the input,
driving the auger to transport the solid material from the receptacle to the output,
outputting the solid material through the output,
wherein the driving step comprises feeding part of the fluid to the second input so as to feed part of the fluid to the cylinders.

A fourth aspect of the invention relates to a method of operating the apparatus according to the second aspect, the method comprising:

providing the solid material in the receptacle,
feeding the fluid to the input,
driving the auger to transport the solid material from the receptacle to the output, the driving step comprising rotating the auger around a first axis,
outputting the solid material from the output,
wherein the driving step comprises:
feeding part of the fluid to the one or more cylinders to move each cylinder in a cyclical, reciprocating movement,
transforming the reciprocating movement of each piston to rotation of the auger around the first axis,
wherein, when a cylinder completes a cycle, the drive rotates the auger at least 20 degrees.

In one embodiment, the method further comprises the step of transporting the solid material output of the output in a hose or tube connected at one end to the output and having a second end.

In one situation, the method further comprises the step of generating a second flow of a second fluid in the tube/hose in a direction away from the output. Naturally, the second flow may be provided in another tube/hose.

In one situation, the method further comprises feeding a third flow of a third fluid to a Venturi element connected to the hose/tube so as to generate a second flow in the hose/tube in a direction away from the output.

In one embodiment, driving step comprises intermittently feeding the part of the fluid on opposite sides of each piston. Thus, the piston may be driven when moving in both directions.

In the following, preferred embodiments of the invention will be described with reference to the drawing, wherein.

The preferred feeding system for a dry ice blasting machine has:
1) a pneumatic motor/cylinder drive unit converting a linear motion into a rotary motion
2) a hopper with 3 straight, approximately vertical sides
3) an auger connected to the drive 1) and feeding the dry ice out of the hopper 2)
4) a single or double/dual hose for transfer of solid material entrained in a fluid and the fluid Description of the Above Mentioned Units:
1) Pneumatic cylinder drive unit converting a linear motion into a rotary motion The system has the following main components:
a) one or more pneumatic cylinders
b) two or more drive pulleys with built-in one way clutches, one way bearings or similar
c) two or more chains, timing belts, v-belts or similar with the ends attached to the cylinder(s).
d) two or more idler pulleys with or without built-in bearings/bushings and naturally a design to suit the chosen chain, belt etc. c)
e) one control system to direct the pneumatic cylinders In FIGS. 1-4 the System is Illustrated with:

A motor 1 with two cylinders (1a) coupled together by aluminum, steel, plastic, composite bars with or without bushings or bearings inserted for guiding two guide rods (1f) parallel to the cylinders. Alternatively, a single cylinder with one or two pistons through rods or a single cylinder with a guide attached or similar. Guide rods may be desired in cases where the cylinder(s) do not offer sufficient guidance by themselves. Guide rod ends can be fixed in either end in base blocks (1e). A cross section of a circular piston is seen at C in FIG. 2.

The base blocks can also be the base for the drive axle/shaft and the idler axle/shaft and for the cylinder piston rod ends directly or indirectly. The base blocks can be made of steel, aluminium or other metals, plastic materials or composite materials. The base blocks can be positioned between a set of pulleys drive axle respectively idler axle but other positions are also possible.

The drive axle naturally rotates, whereas the idler axle need not be rotating.

The idler axis can directly or indirectly, for instance through an insulating block, be attached to the hopper.

The drive shaft is attached to the hopper with a bearing/bushing block which ensures a low friction rotation at very low temperatures down to −78° C. The bearing bushing block can be made of steel, stainless steel, plastic materials, composite materials, ceramics or similar.

Two drive pulleys (1b) with two built-in one way clutches on the same axle. The one way clutches are mounted so they engage in the same rotary direction. They are supported by other bearings or bushings to relief the radial and axial loads. The resulting torque on the output shaft is determined from the total piston area, the pressure in the cylinders and the radial distance from the shaft center to where the chain engages the pulley.

The pulleys can be made of steel, aluminium, other metals, plastic, composite materials or similar.

The chains or similar (1c) which are attached to the cylinder on each side of an axis drawn between idler axle and drive shaft. The chains or similar are not required to be the same material or shape in the entire length. They can for instance be a chain, timing belt or v-belt for the part engaging in the drive pulley and a wire rope for the part running on the idler pulley.

Two idler pulleys (1d) with or without built-in bearings or bushings. The pulleys can be made of steel, aluminium, other metals, plastic, composite materials or similar. They must naturally be designed according to the chain, timing belt, v-belt, wire they are in contact with.

Working Principle and Advantages as Illustrated in FIGS. 1-5B:

The pneumatic cylinders move by gas, compressed air or similar. Piston rod ends remain fixed to the frame. The fluid for moving the cylinders may first pass a filter and a pressure relief valve. A pneumatic circuit designed for activating the cylinders includes valves letting fluid in on one side of the piston and thereby moving the cylinder. Speed is adjusted by a flow control valve controlling the flow out of the opposite piston side. When the cylinder reaches the end position a mechanically operated sensor valve or a logic valve element reverses the flow so former outlet becomes inlet, and former inlet becomes outlet. As result the cylinder movement is also reversed.

Figure 1:
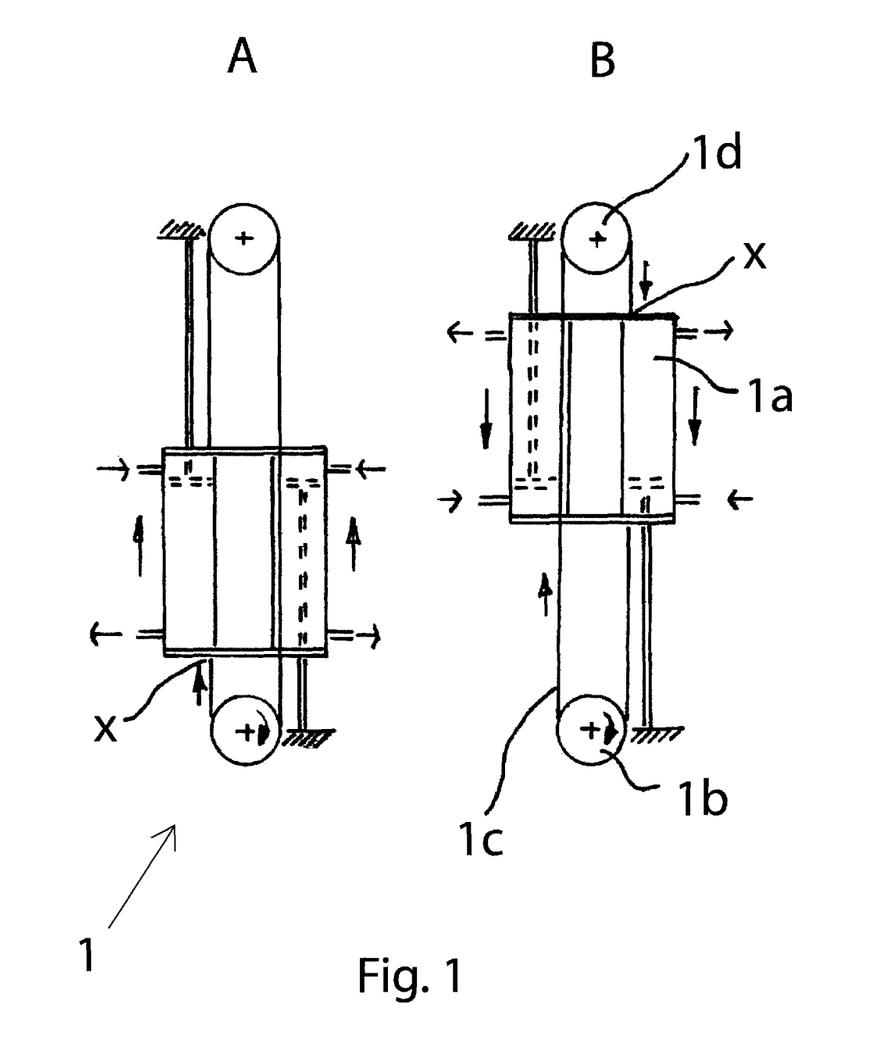
FIG. 1 illustrates the operating principle of a preferred type of motor for driving an auger.
Figure 2:
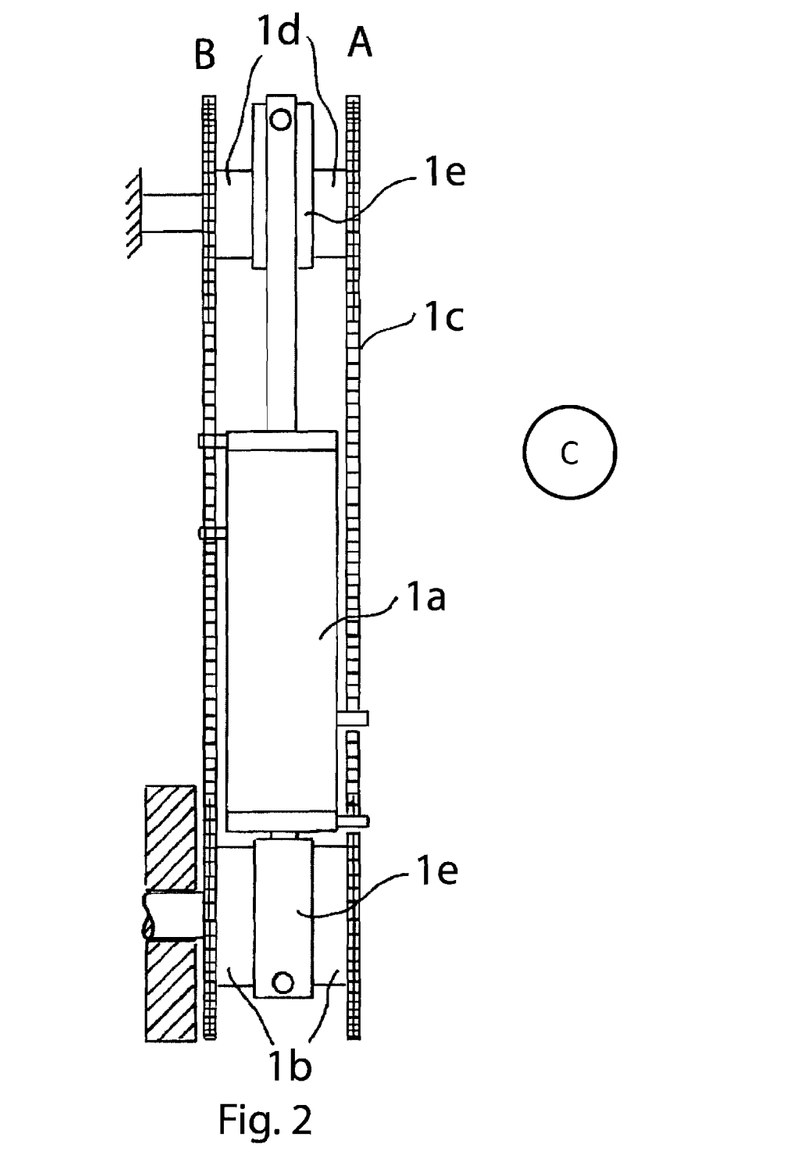
FIG. 2 illustrates the drive portion of the motor of FIG. 1 from another angle.
Figure 3:
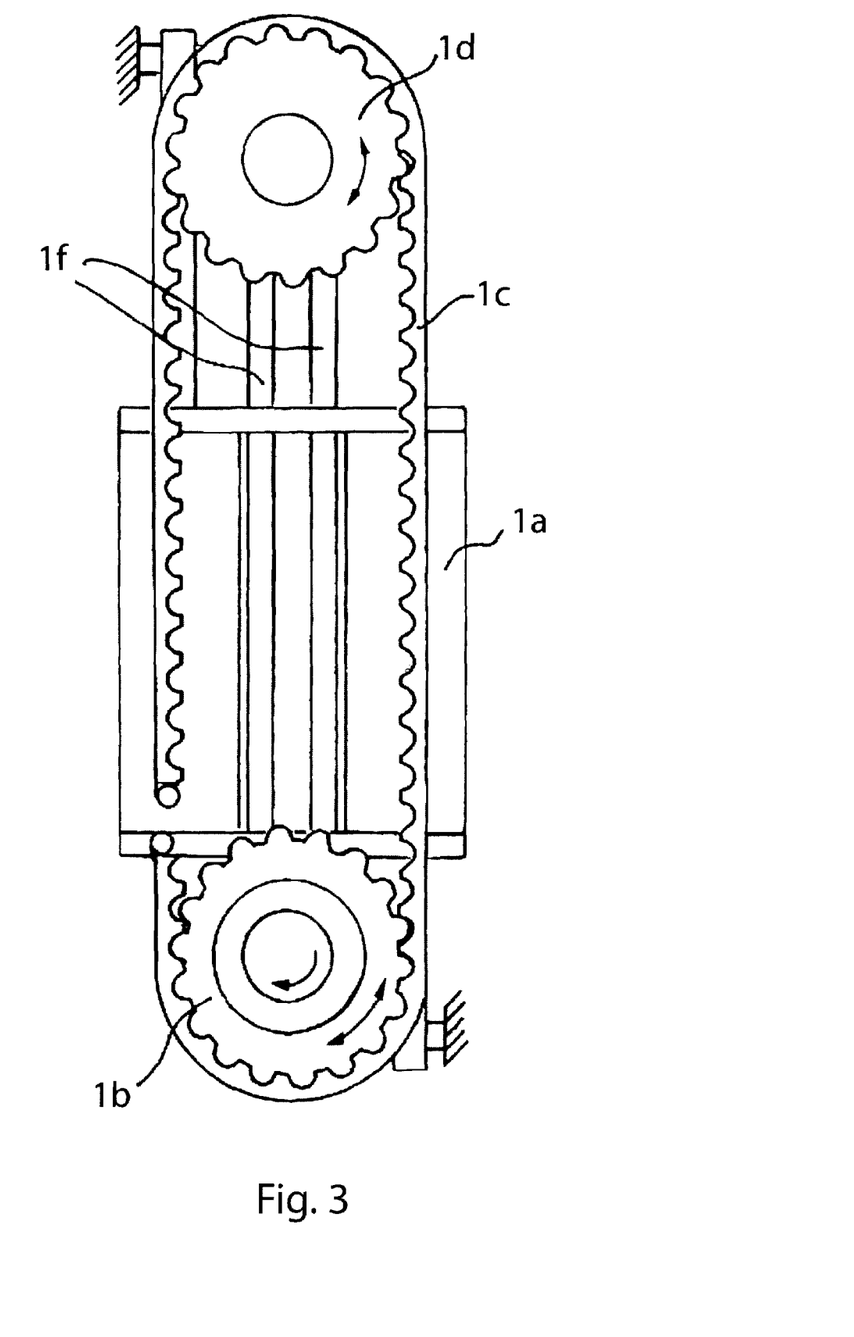
FIG. 3 illustrates the drive of FIG. 2 from another angle.

The chains/timing belts or similar (1c) attached to the pneumatic cylinders move together with the cylinders.

The movement of the chains makes the pulleys rotate.

Only pulling forces can be transferred via the chains.

The chains are (as indicated with "x" in FIG. 1) attached to the cylinders on left and right, respectively, side relative to the pulley(s). This makes it possible to pull on the one and same side of the drive pulleys regardless of the moving direction of the pneumatic cylinders.

Moving the pneumatic cylinders in one direction will engage only one one way clutch/one way bearing/pulley in the chosen direction.

The other pulley will rotate freely because it is being pulled opposite to the engagement direction of the one-way clutch/one-way bearing built into it.

Moving the pneumatic cylinders in the opposite direction will engage only the other one-way bearing/pulley in the same chosen direction. Now the first pulley will rotate freely.

Figure 4:
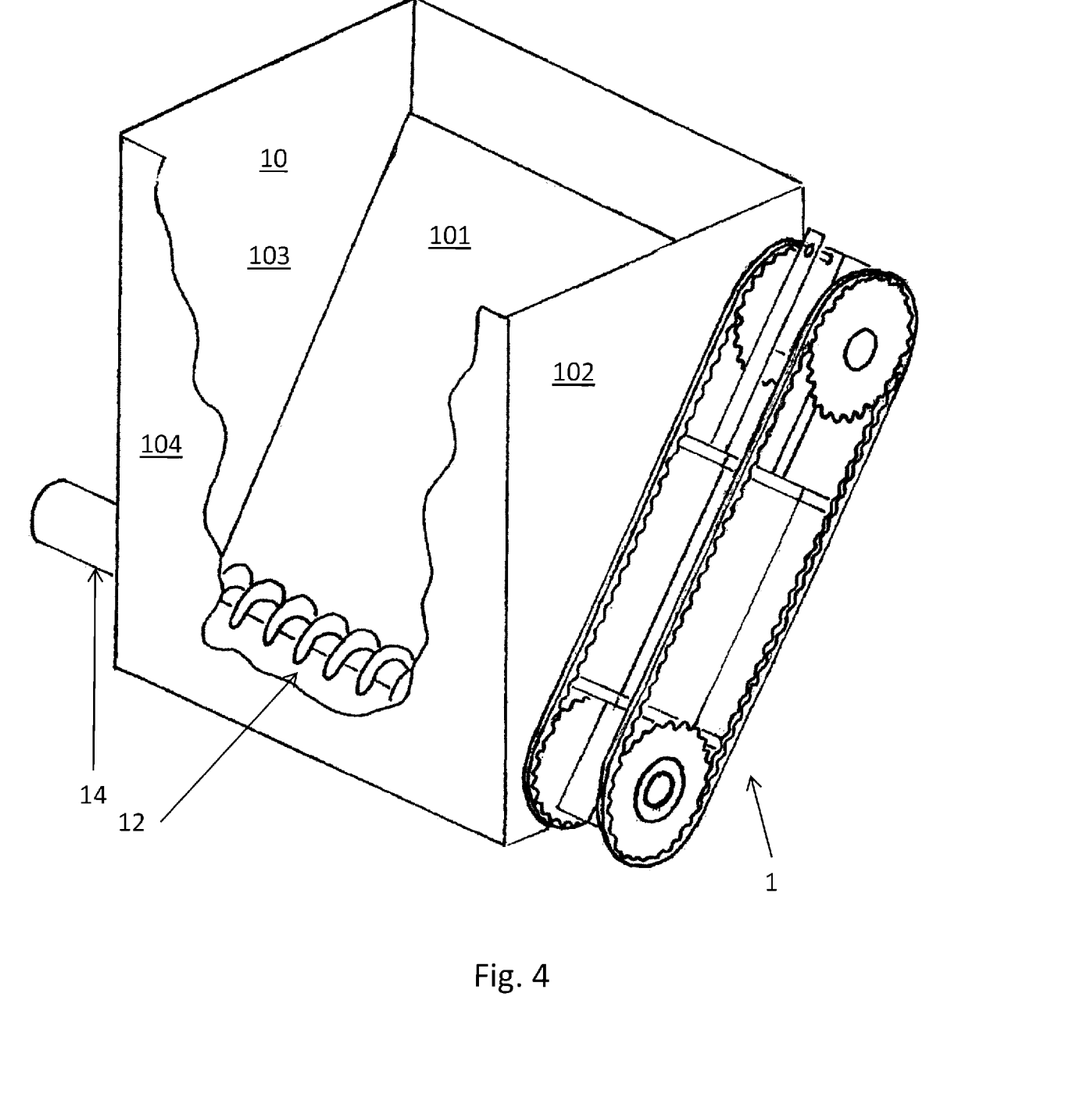
FIG. 4 illustrates an apparatus comprising a receptacle, a drive and an auger driven by the drive.

The hopper 10, see FIG. 4, is made with 3 straight and ideally vertical sides 102, 103, and 104 and the long side >150 mm.

The sides preferably are strong or reinforced at least the edges so they do not give in to thermal contraction. Making the 2 opposing straight sides rectangular eases the attachment of the hopper to other body parts and the attachment of components to the hopper.

The auger 12 is floating in/at the bottom of the hopper and in the outlet pipe 14 where it enters approximately one flight.

The hopper 10 preferably is insulating or covered with insulating material like Rockwool, plastic foam, ceramic insulation, vacuum insulation or similar.

The inclined side 101 preferably has an angle with horizontal of at least 25°.

The sides may be made of steel coated, galvanized, powder coated or stainless steel or other metals, plastic materials such as pvc, polyurethane, polyethylene or other or plywood, fiberboard or composite materials. The hopper can be designed of individual parts joined together by fasteners, welding, gluing, soldering or similar or it can be cast/molded in one piece.

Similarly, the outlet pipe 14 for the dry ice can be made of the above mentioned materials and attached to the hopper 10 or the outlet can be cast/molded as an integral part of the hopper. Preferably it is also insulated if not made by an insulating material.

Auger connected to the drive 1) and feeding the dry ice out of the hopper.

The pulleys drive an axle/drive shaft with an auger attached.

The axle can be made of steel, stainless steel, other metals, plastics, composite materials or ceramics.

The attachment between the drive axle and the auger only prevents the two parts from rotating relative to each other. For instance by a half moon, square, hexagonal, key-way designed cross section capable of transferring the torque. The axial direction is not locked, so easy dismantling without tools of the auger is possible.

The end of the hollow drive shaft is inserted into the auger end in order to minimize cold transfer to the bearings, but vice versa is also possible The auger is made with a uniform outer diameter and a conical internal diameter decreasing from opposite the outlet towards the outlet. The shaft is formed as the internal diameter until the internal diameter is continuous straight. The last part of the auger where the internal diameter is straight is left shaft-less. The auger can be with or without a shaft in full or in part.

A shaft can be straight or conical, solid or hollow. It can be made of steel, coated or not coated, stainless steel, other metals, plastic materials, composite materials, ceramics. The flights are helical turning left or right and typical with a rectangular or trapezoidal cross section. The helical flights can be made of steel, coated or not coated, stainless steel, other metals, plastic materials, composite materials, ceramic. The entire auger made up of the shaft and the flights can be made of the same material but they can also be made of different materials for instance a steel shaft with plastic flights. Metal parts for augers can be cast or pressed.

Figure 5A:
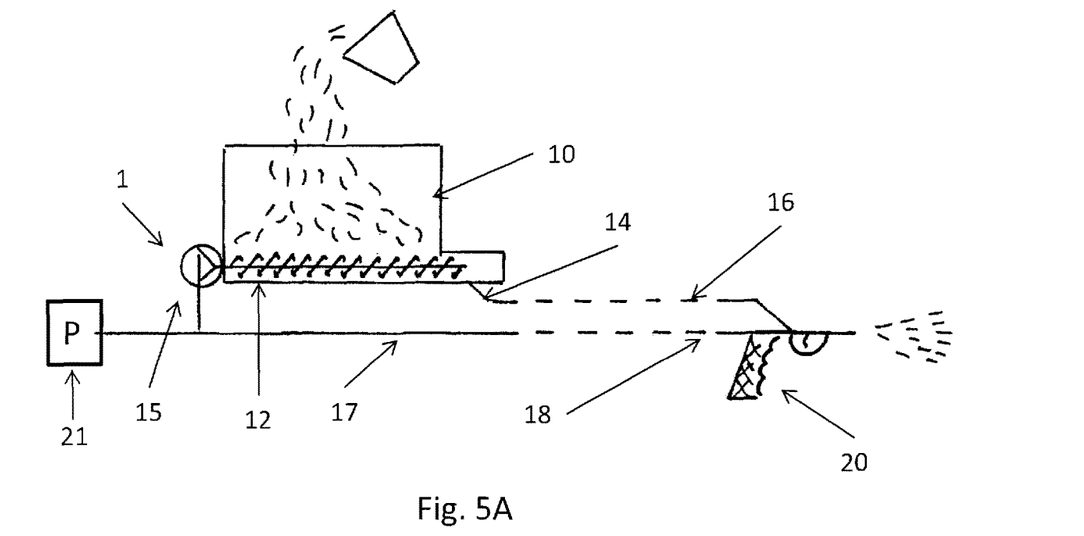
FIGS. 5A and 5B illustrate use of the apparatus of FIG. 4 for dry ice blasting.
Figure 5B:
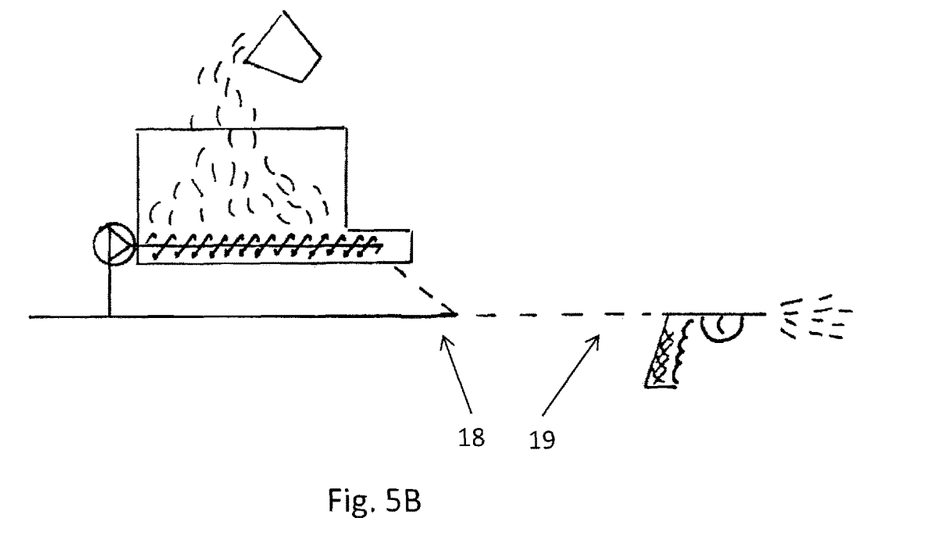

FIGS. 5A and 5B. From the outlet pipe 14 the entrained material is transferred to the nozzle 20 in a vacuum hose or tube 16 separated from the fluid hose 17 in a dual hose, FIG. 5A. Alternatively, the entrained material is transferred to the nozzle in a single hose 19, FIG. 5B. A pump 21 for delivering gas or fluid to the motor 1 and the nozzle 20 is seen at P. A first fluid inlet is seen at 18 and a second fluid inlet, for the motor, input is seen at 15.

The invention claimed is:

1. An apparatus for outputting a solid material, the apparatus comprising:
    a receptacle for receiving the solid material,
    a first input for a fluid,
    an output for solid material,
    an auger for transporting the solid material from the receptacle to the output,
    a motor configured to drive the auger,
    wherein the motor comprises:
    one or more cylinders each comprising a piston, and
    a second input for the fluid and elements for feeding fluid from the second input to the cylinder(s),
    where a cross section of at least one of the piston(s) is at least 700 mm$^2$.

2. The apparatus according to claim 1, further comprising a hose or tube connected at one end to the output and having a second end and being configured to receive the solid material output of the output.

3. The apparatus according to claim 1, further comprising an element for generating a flow of a second fluid in the tube/hose in a direction away from the output.

4. The apparatus according to claim 1, further comprising an outputting element connected to the hose/tube and receiving a flow of a third fluid, the outputting element comprising a Venturi element configured to create, by suction in the hose or tube, a second flow in the hose/tube in a direction away from the output.

5. The apparatus according to claim 1, wherein the second input is configured to intermittently feed the part of the fluid on opposite sides of each piston.

6. An apparatus for outputting a solid material, the apparatus comprising:
a receptacle for receiving the solid material,
an input for a fluid,
an output for solid material,
an auger for transporting the solid material from the receptacle to the output, the auger being configured to rotate around a first axis, a motor for driving the auger, wherein the motor comprises:
one or more cylinders each comprising a piston configured to move within a pertaining cylinder in a cyclical, reciprocating movement, and
a drive transforming the reciprocating movement of each piston, relative to the cylinder, into rotation of the auger around the first axis,
wherein the drive is configured to rotate the auger at least 20 degrees when a cylinder completes a cycle.

7. The apparatus according to claim 6, further comprising a hose or tube connected at one end to the output and having a second end and being configured to receive the solid material output of the output.

8. The apparatus according to claim 6, further comprising an element for generating a flow of a second fluid in the tube/hose in a direction away from the output.

9. The apparatus according to claim 6, further comprising an outputting element connected to the hose/tube and receiving a flow of a third fluid, the outputting element comprising a Venturi element configured to create, by suction in the hose or tube, a second flow in the hose/tube in a direction away from the output.

10. The apparatus according to claim 6, wherein the second input is configured to intermittently feed the part of the fluid on opposite sides of each piston.

11. A method of operating an apparatus comprising:
providing an apparatus for outputting a solid material, the apparatus comprising:
a receptacle for receiving the solid material,
a first input for a fluid,
an output for solid material,
an auger for transporting the solid material from the receptacle to the output,
a motor configured to drive the auger,
wherein the motor comprises:
one or more cylinders each comprising a piston, and
a second input for a fluid and elements for feeding fluid from the second input to the cylinder(s),
where a cross section of at least one of the piston(s) is at least 700 mm$^2$,
providing the solid material in the receptacle,
feeding the fluid to the second input,
driving the auger to transport the solid material from the receptacle to the output,
outputting the solid material through the output,
wherein the driving step comprises feeding part of the fluid to the second input so as to feed part of the fluid from the second input to the cylinders.

12. The method according to claim 11, further comprising the step of transporting the solid material output of the output in a hose or tube connected at one end to the output and having a second end.

13. The method according to claim 12, wherein the driving step comprises intermittently feeding the part of the fluid on opposite sides of each piston.

14. The method according to claim 11, further comprising the step of generating a flow of a second fluid in the tube/hose in a direction away from the output.

15. The method according to claim 14, wherein the driving step comprises intermittently feeding the part of the fluid on opposite sides of each piston.

16. The method according to claim 11, further comprising feeding a flow of a third fluid to a Venturi element connected to the hose/tube so as to generate a second flow in the hose/tube in a direction away from the output.

17. The method according to claim 16, wherein the driving step comprises intermittently feeding the part of the fluid on opposite sides of each piston.

18. The method according to claim 11, wherein the driving step comprises intermittently feeding the part of the fluid on opposite sides of each piston.

19. A method of operating an apparatus comprising:
providing an apparatus for outputting a solid material comprising:
a receptacle for receiving the solid material,
an input for a fluid,
an output for solid material,
an auger for transporting the solid material from the receptacle to the output, the auger being configured to rotate around a first axis, a motor for driving the auger, wherein the motor comprises:
one or more cylinders each comprising a piston configured to move within the pertaining cylinder in a cyclical, reciprocating movement, and
a drive transforming the reciprocating movement of each piston, relative to the cylinder, into rotation of the auger around the first axis, wherein the drive is configured to rotate the auger at least 20 degrees when a cylinder completes a cycle,
providing the solid material in the receptacle,
feeding the fluid to the second input,
driving the auger to transport the solid material from the receptacle to the output, the driving step comprising rotating the auger around a first axis, outputting the solid material from the output,
wherein the driving step comprises:
feeding part of the fluid to the one or more cylinders to move each cylinder in a cyclical, reciprocating movement,
transforming the reciprocating movement of each piston to rotation of the auger around the first axis,
wherein, when a cylinder completes a cycle, the drive rotates the auger at least 20 degrees.

20. The method according to claim 19, further comprising the step of transporting the solid material output of the output in a hose or tube connected at one end to the output and having a second end.

21. The method according to claim 19, further comprising the step of generating a flow of a second fluid in the tube/hose in a direction away from the output.

22. The method according to claim 19, further comprising feeding a flow of a third fluid to a Venturi element connected to the hose/tube so as to generate a second flow in the hose/tube in a direction away from the output.

23. The method according to claim 19, wherein the driving step comprises intermittently feeding the part of the fluid on opposite sides of each piston.

* * * * *